United States Patent
Brock

(10) Patent No.: US 9,082,033 B2
(45) Date of Patent: Jul. 14, 2015

(54) APPARATUS FOR AND METHOD OF OPTIMIZING TARGET READING PERFORMANCE OF IMAGING READER IN BOTH HANDHELD AND HANDS-FREE MODES OF OPERATION

(71) Applicant: Symbol Technologies, Inc., Schaumburg, IL (US)

(72) Inventor: Christopher W. Brock, Manorville, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 57 days.

(21) Appl. No.: 13/781,812

(22) Filed: Mar. 1, 2013

(65) Prior Publication Data

US 2014/0246496 A1   Sep. 4, 2014

(51) Int. Cl.
*G06K 7/10* (2006.01)
*G06K 7/14* (2006.01)

(52) U.S. Cl.
CPC .......... *G06K 7/1404* (2013.01); *G06K 7/10722* (2013.01); *G06K 7/10792* (2013.01); *G06K 7/10821* (2013.01)

(58) Field of Classification Search
USPC ................................. 235/462.01–462.49, 454
See application file for complete search history.

(56) References Cited

U.S. PATENT DOCUMENTS

| | | | | |
|---|---|---|---|---|
| 4,613,759 | A * | 9/1986 | Frohbach | 250/566 |
| 7,080,785 | B2 * | 7/2006 | Nasu | 235/454 |
| 7,124,950 | B2 * | 10/2006 | Blake et al. | 235/462.36 |
| 7,697,172 | B2 | 4/2010 | Ikeno et al. | |
| 8,121,392 | B2 | 2/2012 | Popovich et al. | |
| 8,228,418 | B2 | 7/2012 | Pillman et al. | |
| 8,261,991 | B2 | 9/2012 | Barkan et al. | |
| 8,265,404 | B2 | 9/2012 | Nunnink et al. | |
| 8,348,167 | B2 | 1/2013 | Wang | |
| 2002/0125317 | A1 | 9/2002 | Hussey et al. | |
| 2009/0032597 | A1 | 2/2009 | Barber et al. | |
| 2010/0020970 | A1 | 1/2010 | Liu et al. | |

OTHER PUBLICATIONS

International Search Report mailed Jun. 6, 2014 in counterpart PCT application PCT/US2014/018511.
US 8,146,817, 04/2012, Barber et al. (withdrawn)

\* cited by examiner

*Primary Examiner* — Jamara Franklin
(74) *Attorney, Agent, or Firm* — Nong-Qiang Fan

(57) ABSTRACT

An imaging reader reads targets by image capture in both handheld and hands-free modes of operation. Upon detection of the mode of operation, a controller sets the resolution and frame rate of a solid-state imaging sensor to different values in each mode to optimize target reading performance in each mode.

18 Claims, 3 Drawing Sheets ically initiate reading whenever a target enters the field of view in the hands-free mode of operation. At other times, the image sensor itself may be employed to detect entry of the target into the field of view.

APPARATUS FOR AND METHOD OF OPTIMIZING TARGET READING PERFORMANCE OF IMAGING READER IN BOTH HANDHELD AND HANDS-FREE MODES OF OPERATION

FIELD OF THE DISCLOSURE

The present disclosure relates generally to an apparatus for, and a method of, optimizing target reading performance of an imaging reader in both handheld and hands-free modes of operation and, more particularly, to operating a solid-state imager of the reader at different resolutions and frame rates in each mode to optimize reading performance.

BACKGROUND

Solid-state imaging systems or imaging readers have been used, in both handheld and/or hands-free modes of operation, to electro-optically read symbol targets, such as one- and/or two-dimensional bar code symbols, each bearing elements, e.g., bars and spaces, of different widths and reflectivities, to be decoded, as well as other targets, such as forms, documents, labels, receipts, signatures, drivers' licenses, identification badges, payment/loyalty cards, and the like, each bearing one or more form fields, typically containing alphanumeric characters, images, or bar code symbols.

A known exemplary imaging reader includes a housing, either held by a user in the handheld mode, or supported on a support, such as a stand, a cradle, a docking station, or a support surface, in the hands-free mode; a window supported by the housing and aimed at the target; and an imaging engine or module supported by the housing and having a solid-state imager (or image sensor or camera) with a sensor array of photocells or light sensors (also known as pixels), and an imaging lens assembly for capturing return light scattered and/or reflected from the target being imaged along an imaging axis through the window over a field of view, and for projecting the return light onto the sensor array to initiate capture of an image of the target over a range of working distances in which the target can be read. Such an imager may include a one- or two-dimensional charge coupled device (CCD) or a complementary metal oxide semiconductor (CMOS) device and associated circuits for producing and processing electrical signals corresponding to a one- or two-dimensional array of pixel data over the field of view. These electrical signals are decoded and/or processed by a programmed microprocessor or controller into information related to the target being read, e.g., decoded data indicative of a symbol, or characters or marks indicative of text in a form field of a form, or into a picture indicative of a picture on the form. A trigger is typically manually activated by the user to initiate reading in the handheld mode of operation. Sometimes, an object sensing assembly is employed to automatically initiate reading whenever a target enters the field of view in the hands-free mode of operation. At other times, the image sensor itself may be employed to detect entry of the target into the field of view.

In the hands-free mode, the user may slide or swipe the target past the window in either horizontal and/or vertical and/or diagonal directions in a "swipe" mode. Alternatively, the user may present the target to an approximate central region of the window in a "presentation" mode. The choice depends on the type of target, operator preference, or on the layout of a workstation in which the reader is used. In the handheld mode, the user holds the reader in his or her hand at a certain working distance from the target to be imaged and initially aims the reader at the target. The user may first lift the reader from a countertop or like support surface, or from a support, such as a stand, a cradle, or a docking station. Once reading is completed, the user may return the reader to the countertop, or to the support, to resume hands-free operation.

Although the known imaging readers are generally satisfactory for their intended purpose, one concern relates to different reading performance requirements for the handheld and hands-free modes of operation. It is known to configure an imaging reader with a two-dimensional image sensor having a full or high resolution of, for example, 1280 pixels×960 pixels. Cost-effective image sensor interfaces, e.g., a single channel mobile industry processor interface (MIPI) serial bus, or a single channel parallel bus, limit the frame rate of this high resolution image sensor to a low frame rate of about 30 frames per second, or less. Thus, the data clock frame rate to get pixel information off of the image sensor is limited. At a fixed frame rate, more pixels means more time to read a full frame and, concomitantly, less frames are available in a given time period.

Such a full resolution is desirable for the handheld mode, because it avoids truncating the range of working distances in which targets can be read. In the absence of focus limitations, the working range of an imaging reader is dependent on the reader's ability to distinguish among individual elements of the target. For a given field of view of the image sensor, more pixels allow smaller target elements to be resolved. This not only means smaller in terms of physical dimension of the target elements, but also smaller in terms of the apparent size of a target further away from the reader. Thus, a higher pixel count of an image sensor for a given field of view provides a longer working distance range. However, in the hands-free mode, an extended, long range of working distances, e.g., over one foot, is not desired and, indeed, a very limited, short range, e.g., on the order of a few inches or less, is preferred, because the targets to be read are typically brought to the immediate vicinity of the reader. An imaging reader configured for an optimum long working distance range for handheld operation is, therefore, at a disadvantage when operated in the hands-free mode.

Similarly, such a low frame rate is not desirable in the hands-free mode, especially when the image sensor itself is employed to detect motion and entry of the target into the field of view. A faster frame rate would be desirable in the hands-free mode for more aggressive target detection. An imaging reader configured for a low frame rate for handheld operation is, therefore, at a disadvantage when operated in the hands-free mode.

Accordingly, there is a need for an apparatus for, and a method of, optimizing target reading performance parameters, such as imager resolution, frame rate, and working distance range, during operation in both the handheld and hands-free modes, and for changing such reading performance parameters to different values in each mode to optimize the reading performance.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
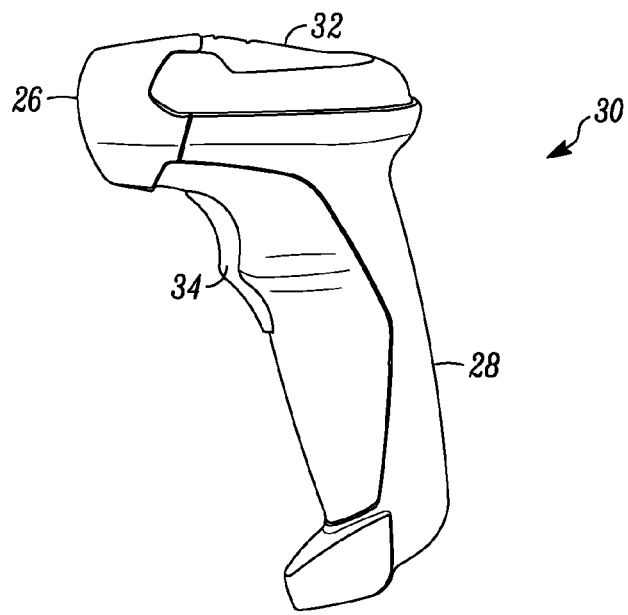
FIG. 1 is a side elevational view of an imaging reader operative, in either a handheld mode or a hands-free mode, for capturing images from targets to be electro-optically read in accordance with this invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An apparatus for reading a target by image capture, in accordance with one feature of this invention, includes a housing, a window supported by the housing, and a solid-state imager, e.g., a CCD or a CMOS device, supported by the housing. The imager has an array of light sensors looking at a field of view that extends through the window to the target, and is operative for capturing return light from the target to be read. A detector is operative for detecting a handheld mode of operation in which a user holds the housing during image capture, and a hands-free mode of operation in which the user does not hold the housing during image capture. A controller is operative for controlling the imager to operate at a first resolution and a first frame rate upon detection of the handheld mode of operation, and for controlling the imager to operate at a different second resolution and a different second frame rate upon detection of the hands-free mode of operation.

In a preferred embodiment, the first resolution and the first frame rate are set at default values for the handheld mode of operation, and the controller changes the default values for the hands-free mode of operation. For example, the first resolution at which the imager operates is effectively greater than the second resolution at which the imager operates, and the first frame rate is less than second frame rate. More particularly, the first resolution at which the imager operates has effectively four times as many light sensors as the second resolution at which the imager operates, and the first frame rate is half of the second frame rate.

By way of non-limiting numerical example, for a two-dimensional imager, the first or default resolution is 1280 pixels×960 pixels, and the first or default frame rate is 30 frames per second in the handheld mode. Upon detection of the hands-free mode, the second resolution is changed by the controller to 640 pixels×480 pixels, and the second frame rate is changed by the controller to 60 frames per second. Thus, the greater resolution, and the concomitant longer working distance range, enhances reading performance in the handheld mode, while the greater frame rate enhances target detection, target motion tracking, and reading performance in the hands-free mode.

The apparatus advantageously may further includes a support for supporting the housing in the hands-free mode of operation, in which case, the detector is mounted on the housing and/or on the support. Advantageously, the support is a docking station mounted on a support surface, such as a countertop, in which case, the detector includes a first detecting element on the housing and a second detecting element on the docking station.

In accordance with another feature of this invention, a method of reading a target by image capture, is performed by supporting a window on a housing, by capturing return light from the target to be read with an array of light sensors of a solid-state imager having a field of view that extends through the window to the target, by detecting a handheld mode of operation in which a user holds the housing during image capture, and a hands-free mode of operation in which the user does not hold the housing during image capture, and by controlling the imager to operate at a first resolution and a first frame rate upon detection of the handheld mode of operation, and by controlling the imager to operate at a different second resolution and a different second frame rate upon detection of the hands-free mode of operation.

Turning now to the drawings, reference numeral 30 in FIG. 1 generally identifies a cordless imaging reader ergonomically configured as a gun-shaped housing having an upper barrel or body 32 and a lower handle 28 tilted rearwardly away from the body 32 at an angle of inclination, for example, fifteen degrees, relative to the vertical. A light-transmissive window 26 is located adjacent the front or nose of the body 32. The imaging reader 30 is held by the handle 28 in an operator's hand and used in a handheld mode in which a trigger 34 is manually depressed to initiate imaging of targets, especially symbols and/or forms, to be read in a range of working distances relative to the window 26. Housings of other configurations could also be employed. The reader 30 could also be corded. As described below in connection with FIG. 3, when not held in the operator's hand, the reader 30 may be mounted on a support 50 in a hands-free mode of operation.

Figure 2:
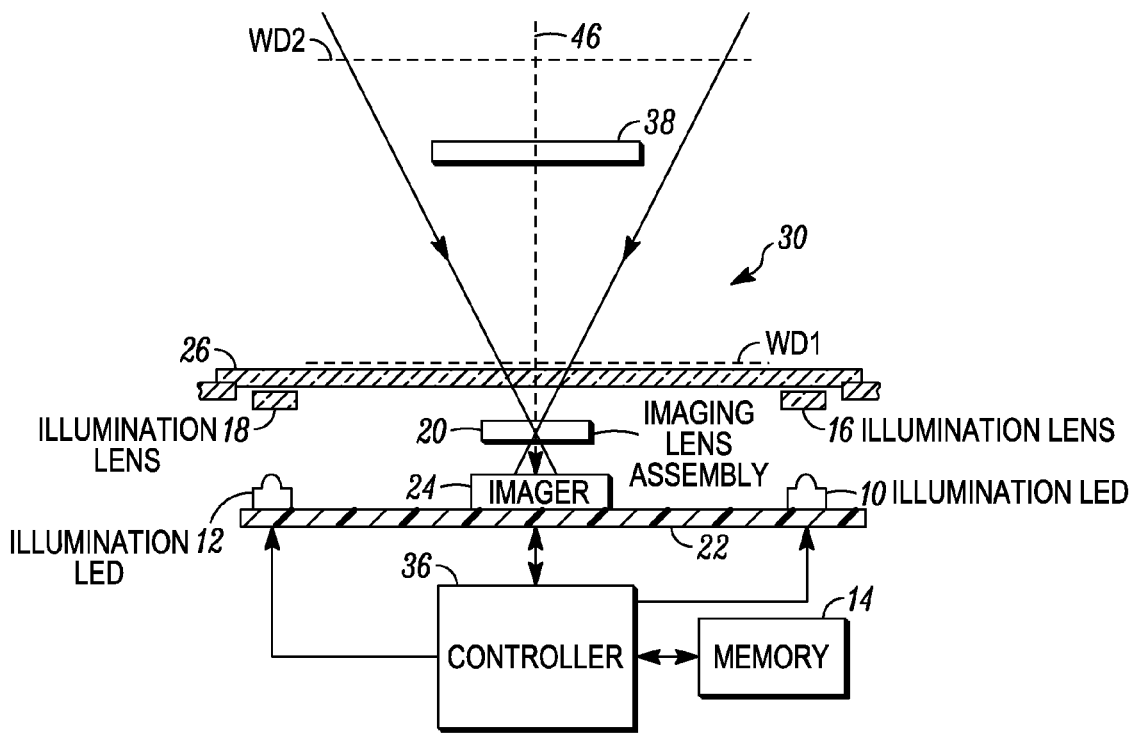
FIG. 2 is a schematic diagram of various components of the reader of FIG. 1.

As schematically shown in FIG. 2, an imaging system or data capture module includes an imager 24 mounted on a printed circuit board (PCB) 22 in the reader 30. The imager 24 is a solid-state device, for example, a CCD or a CMOS imager, preferably having a two-dimensional array of addressable image sensors or pixels arranged in mutually orthogonal rows and columns, and operative for detecting return light captured by an imaging lens assembly 20 along an imaging axis 46 through the window 26. The return light is scattered and/or reflected from a target 38 over the field of view. The field of view is generally perpendicular to the imaging axis 46.

The imaging lens assembly 20 is part of the imaging system and is operative for focusing the return light onto the array of image sensors to enable the target 38 to be read. The target 38 may be located anywhere in a working range of distances between a close-in working distance (WD1) and a far-out working distance (WD2). In a preferred embodiment, WD1 is about one-half inch from the window 26, and WD2 is about thirty inches from the window 26. The imaging lens assembly 20 is located remotely from the window 26, for example, over forty millimeters away.

An illuminating light assembly is optionally included in the data capture module and is mounted in the imaging reader. The illuminating light assembly includes an illumination light source, e.g., at least one light emitting diode (LED), and preferably a plurality of LEDs, such as a pair of LEDs 10, 12, and a pair of lenses 16, 18 configured to generate a substantially uniform distributed illumination pattern of light on and along the target 38 to be read by image capture. At least part of the scattered and/or reflected return light is derived from the illumination pattern of light on and along the target 38.

As shown in FIG. 2, the imager 24 and the LEDs 10, 12 are operatively connected to a controller or microprocessor 36 operative for controlling the operation of these components. A memory 14 is connected and accessible to the controller 36. Preferably, the microprocessor is the same as the one used for processing the return light from the target 38.

In the handheld mode of operation, in response to actuation of the trigger 34, the microprocessor 36 sends a command signal to energize the LEDs 10, 12 for a short exposure time period, say 500 microseconds or less, and energizes and exposes the imager 24 to collect the return light, e.g., illumination light and/or ambient light, from the target 38 only during said exposure time period. In the hands-free mode of operation, the microprocessor 36 may either be free-running and continuously or intermittently send the aforementioned command signal, or the imager 24 may be employed to detect entry of the target 38 into the field of view and, in response to such target entry detection, the microprocessor 36 sends the aforementioned command signal.

Figure 3:
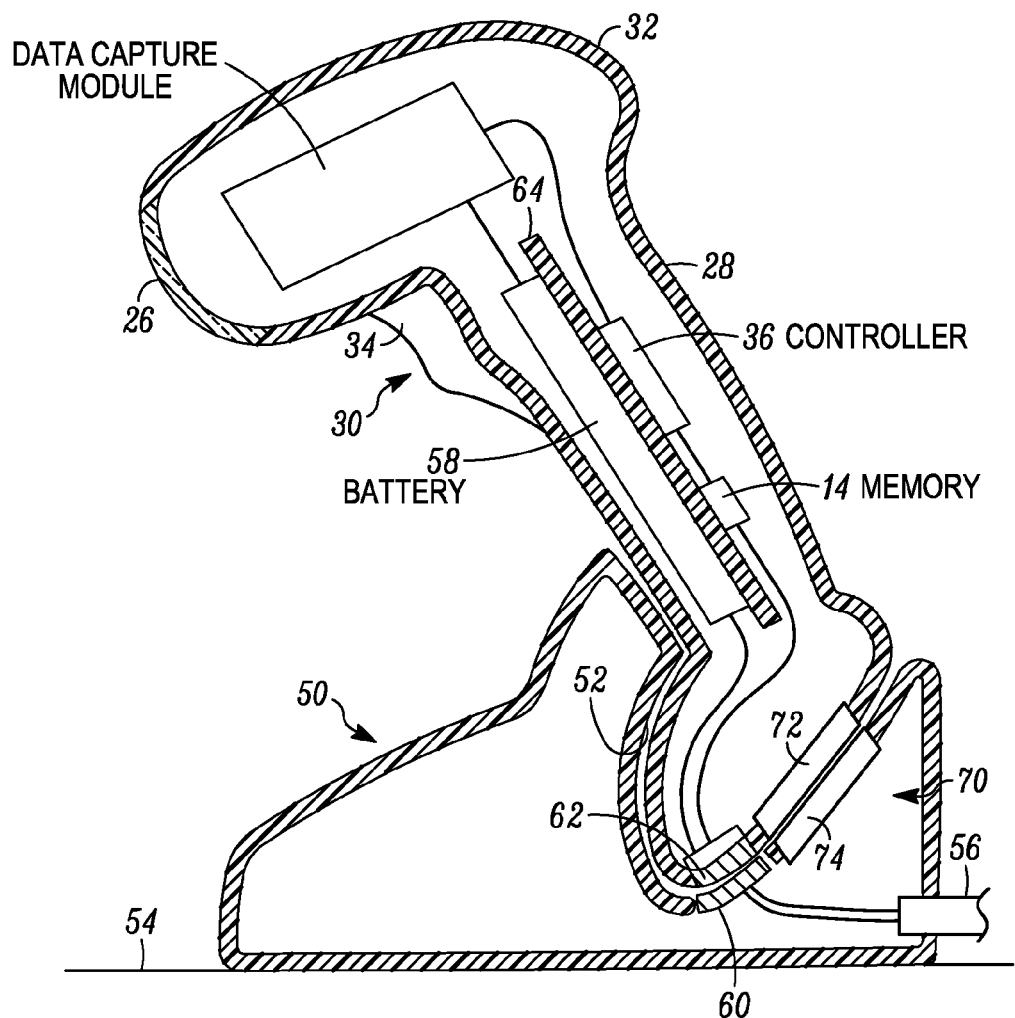
FIG. 3 is an enlarged, part-schematic, part-sectional view depicting the reader of FIG. 1 operated in a hands-free mode.

Turning now to FIG. 3, the support 50 is illustrated by a docking or base station having a compartment 52 for receiving and holding the reader 30 in a hands-free mode when the reader 30 is not handheld. The base station rests on a support surface 54, such as a countertop or a tabletop. In the hands-free mode, the docked reader operates as a workstation to which targets to be read can be brought in front of the window 26 for image capture, as described above.

As illustrated in FIG. 3, the base station is connected to a cable 56 that includes power conductors for supplying electrical power to recharge a battery 58 in the cordless reader 30, as well as data conductors for transmitting decoded data, control data, update data, etc. between the reader 30 and a remote host (not illustrated). Electrical contacts 60 on the base station mate with electrical contacts 62 on the reader 30 to enable mutual electrical communication in the hands-free, docked state. The controller 36 and the memory 14 are mounted on a printed circuit board (PCB) 64 mounted in the handle 28, and are connected to the data capture module, as described above in FIG. 2, which is mounted in the body 32.

As also illustrated in FIG. 3, a detector 70 having a first detecting element 72 on the reader 30, and a second detecting element 74 on the support 50, is operative for detecting the presence of the reader 30 on the support 50 to indicate the hands-free mode to the controller 36, and the absence of the reader 30 on the support 50 to indicate the handheld mode to the controller 36.

In one embodiment, the detecting elements 72, 74 include a magnetic sensor, such as a reed switch or a Hall effect sensor, on the support 50 and/or the reader 30. When the support 50 and the reader 30 are brought into proximity with each other, the detecting elements 72, 74 electromagnetically interact, and signal the controller 36. In another embodiment, the detecting elements 72, 74 include a mechanical switch on the support 50 and/or the reader 30. When the support 50 and the reader 30 are brought into proximity with each other, the mechanical switch is actuated, and the controller 36 is signaled. Optical sensors could also be used. In still another embodiment, a field attenuation portion or wall of the support 50 serves to reduce a strength of an electromagnetic field propagated by an antenna within the reader 30 when the reader 30 is mounted on the support 50. Myriad other electrical, mechanical, optical and electromagnetic detectors could also be employed to distinguish between the handheld and hands-free modes.

In accordance with this invention, the controller 36 is operative for controlling the imager 24 to operate at a first resolution and a first frame rate upon detection of the handheld mode of operation by the detector 70, and for controlling the imager 24 to operate at a different second resolution and a different second frame rate upon detection of the hands-free mode of operation by the detector 70. As explained below, the imager 24 has the ability to image in multiple resolution modes.

In a preferred embodiment, the first resolution and the first frame rate are set at default values for the handheld mode of operation, and the controller 36 changes the default values for the hands-free mode of operation. For example, the first resolution at which the imager operates is effectively greater than the second resolution at which the imager operates, and the first frame rate is less than second frame rate. More particularly, the first resolution at which the imager operates has effectively four times as many light sensors as the second resolution at which the imager operates, and the first frame rate is half of the second frame rate.

By way of non-limiting numerical example, for a two-dimensional imager 24, the first or default resolution is 1280 pixels×960 pixels, and the first or default frame rate is 30 frames per second in the handheld mode. Upon detection of the hands-free mode by the detector 70, the second resolution is changed by the controller 36 to 640 pixels×480 pixels, and the second frame rate is changed by the controller 36 to 60 frames per second. Thus, the greater resolution, and the concomitant longer working distance range, enhances reading performance in the handheld mode, while the greater frame rate enhances target detection, target motion tracking, and reading performance in the hands-free mode.

It will be understood that each of the elements described above, or two or more together, also may find a useful application in other types of constructions differing from the types described above. For example, the support 50 need not be the illustrated base station, but can be any stand, or cradle, or even the support surface 54 itself.

Figure 4:
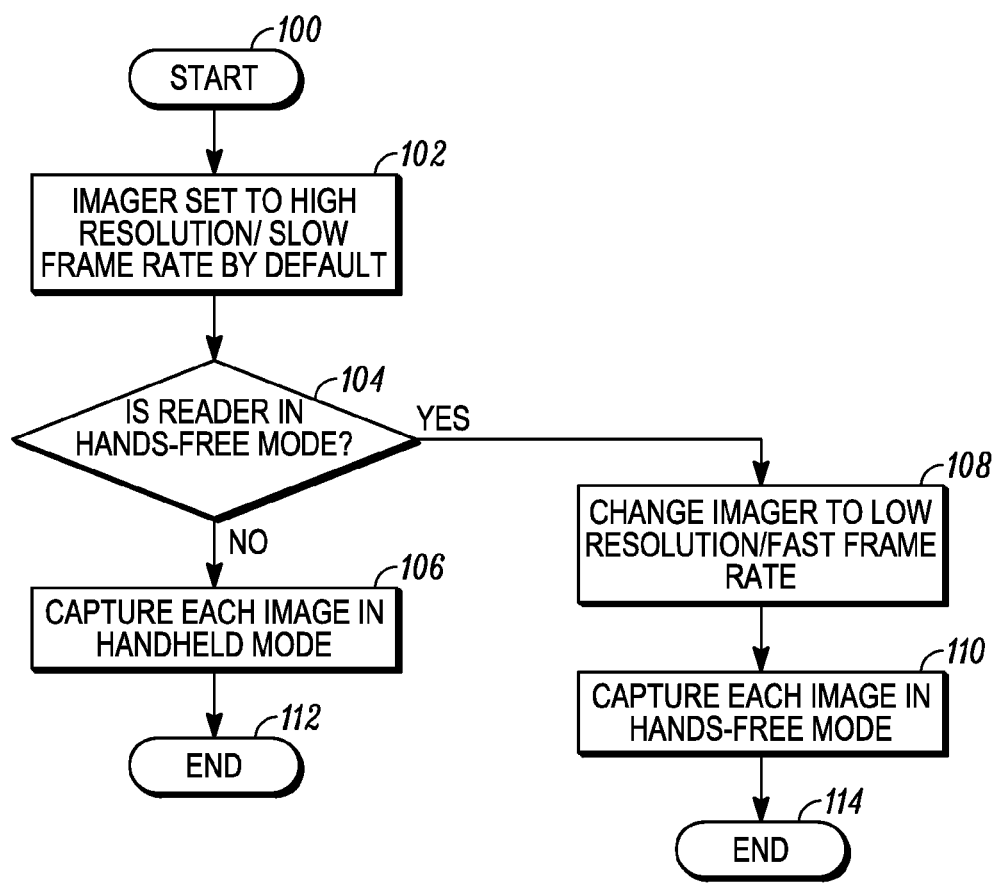
FIG. 4 is a flow chart depicting steps performed in accordance with the method of this invention.

Turning now to the flow chart of FIG. 4, beginning a reading session at start block 100, the imager 24 is initially set to a high resolution and a slow frame rate in block 102 by default. Then, the detector in the decision block 104 determines whether the reader 30 is in the hands-free mode. If not, then each target image is captured in block 106, and the reading session terminates in end block 112. If the hands-free mode is detected, then the controller 36 changes the default settings to a lower resolution and a higher frame rate in block 108, after which each target image is captured in block 110, and then the reading session terminates in end block 114.

The imager 24 thus may be operated in a high resolution mode, in which a digital image data value from each individual pixel is obtained, or in a lower resolution mode in which charges from multiple pixels are summed together electrically in a process known as binning. Binning reduces the amount of data obtained and effectively obtains information from fewer, effectively larger, pixels. Other methods to produce such effectively larger pixels include summing pixel values digitally, or summing the voltage associated with each pixel, as well as sampling techniques. For example, a sparse sampling of the pixels may be used where some of the pixels on the imager 24 are not used. Combinations of the various methods are also possible such as a sparse readout of binned pixels that are later summed.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An apparatus for reading a target by image capture, comprising:
   a housing;
   a window supported by the housing;
   a solid-state imager supported by the housing and having an array of light sensors looking at a field of view that extends through the window to the target, and operative for capturing return light from the target to be read;
   a detector for detecting a handheld mode of operation in which a user holds the housing during image capture, and a hands-free mode of operation in which the user does not hold the housing during image capture;
   a controller for controlling the imager to operate at a first resolution and a first frame rate upon detection of the handheld mode of operation, and for controlling the imager to operate at a different second resolution and a different second frame rate upon detection of the hands-free mode of operation;
   wherein the first resolution at which the imager operates has effectively two times as many light sensors in a row as the second resolution at which the imager operates and has effectively two times as many light sensors in a column as the second resolution at which the imager operates; and
   wherein the first frame rate is less than second frame rate.

2. The apparatus of claim 1, wherein the first resolution and the first frame rate are set at default values for the handheld mode of operation, and wherein the controller changes the default values for the hands-free mode of operation.

3. The apparatus of claim 1; and a support for supporting the housing in the hands-free mode of operation, and wherein the detector is mounted on at least one of the housing and the support.

4. The apparatus of claim 3, wherein the support is a docking station mounted on a support surface, and wherein the detector includes a first detecting element on the housing and a second detecting element on the docking station.

5. The apparatus of claim 1, wherein the first resolution has effectively 1280 pixels×960 pixels and the second resolution has effectively 640 pixels×480 pixels.

6. An apparatus for reading targets by image capture, comprising:
   a housing;
   a window supported by the housing;
   a solid-state imager supported by the housing and having an array of light sensors having a default resolution and looking at a field of view that extends through the window to a target, and operative for capturing return light from the target to be read at a default frame rate;

a detector for detecting a handheld mode of operation in which a user holds the housing during image capture, and a hands-free mode of operation in which the user does not hold the housing during image capture;

a controller operative, in response to the detector, for controlling the imager to operate at the default resolution and the default frame rate to acquire an image of the target in the handheld mode of operation, and for controlling the imager to operate at a different predetermined resolution that is less than the default resolution, and at a different predetermined frame rate that is greater than the default frame rate to acquire an image of another target in the hands-free mode of operation and;

wherein the default resolution at which the imager operates has effectively two times as many light sensors in a row as the predetermined resolution at which the imager operates and has effectively two times as many light sensors in a column as the predetermined resolution at which the imager operates.

7. The apparatus of claim 6, wherein the controller changes the default resolution and the default frame rate to the predetermined resolution and the predetermined frame rate, respectively, upon detection of the hands-free mode of operation by the detector.

8. The apparatus of claim 6, wherein the default frame rate is half of the predetermined frame rate.

9. The apparatus of claim 6; and a support for supporting the housing in the hands-free mode of operation, and wherein the detector is mounted on at least one of the housing and the support.

10. The apparatus of claim 9, wherein the support is a docking station mounted on a support surface, and wherein the detector includes a first detecting element on the housing and a second detecting element on the docking station.

11. The apparatus of claim 6, wherein the default resolution has effectively 1280 pixels×960 pixels and the predetermined resolution has effectively 640 pixels×480 pixels.

12. A method of reading a target by image capture, comprising:

supporting a window on a housing;

capturing return light from the target to be read with an array of light sensors of a solid-state imager having a field of view that extends through the window to the target;

detecting a handheld mode of operation in which a user holds the housing during image capture, and a hands-free mode of operation in which the user does not hold the housing during image capture;

controlling the imager to operate at a first resolution and a first frame rate upon detection of the handheld mode of operation, and controlling the imager to operate at a different second resolution and a different second frame rate upon detection of the hands-free mode of operation; and configuring the first resolution at which the imager operates to effectively have two times as many light sensors at a row as the second resolution at which the imager operates, and configuring the first resolution at which the imager operates to effectively have two times as many light sensors at a column as the second resolution at which the imager operates.

13. The method of claim 12, and setting the first resolution and the first frame rate at default values for the handheld mode of operation, and changing the default values for the hands-free mode of operation.

14. The method of claim 12, setting the first frame rate to be less than second frame rate.

15. The method of claim 14, configuring the first frame rate to be half of the second frame rate.

16. The method of claim 12; and supporting the housing on a support in the hands-free mode of operation, and mounting a detector on at least one of the housing and the support.

17. The method of claim 16, and configuring the support as a docking station mounted on a support surface, and configuring the detector with a first detecting element mounted on the housing and with a second detecting element mounted on the docking station.

18. The method of claim 16, wherein the first resolution has effectively 1280 pixels×960 pixels and the second resolution has effectively 640 pixels×480 pixels.

* * * * *